United States Patent
Borseth et al.

(10) Patent No.: US 12,502,636 B2
(45) Date of Patent: Dec. 23, 2025

(54) CARBON DIOXIDE CAPTURE SYSTEM COMPRISING A COMPRESSOR AND AN EXPANDER AND A METHOD OF USING SUCH A SYSTEM

(71) Applicant: Karbon CCS Global Ltd, Limassol (CY)

(72) Inventors: Knut Borseth, Sandefjord (NO); Henrik Fleischer, Slependen (NO)

(73) Assignee: Karbon CCS Global Ltd, Limassol (CY)

(*) Notice: Subject to any disclaimer, the term of this patent is extended or adjusted under 35 U.S.C. 154(b) by 536 days.

(21) Appl. No.: 17/919,167

(22) PCT Filed: Apr. 14, 2021

(86) PCT No.: PCT/NO2021/050100
§ 371 (c)(1),
(2) Date: Oct. 14, 2022

(87) PCT Pub. No.: WO2021/210989
PCT Pub. Date: Oct. 21, 2021

(65) Prior Publication Data
US 2023/0173430 A1    Jun. 8, 2023

(30) Foreign Application Priority Data
Apr. 14, 2020   (NO) .................... 20200450

(51) Int. Cl.
*B01D 53/14* (2006.01)
*B01D 53/62* (2006.01)
(Continued)

(52) U.S. Cl.
CPC ..... *B01D 53/1475* (2013.01); *B01D 53/1431* (2013.01); *B01D 53/62* (2013.01);
(Continued)

(58) Field of Classification Search
None
See application file for complete search history.

(56) References Cited

U.S. PATENT DOCUMENTS

| 2007/0006565 A1 | 1/2007 | Fleischer et al. |
| 2009/0025390 A1 | 1/2009 | Christensen et al. |

FOREIGN PATENT DOCUMENTS

| WO | 0048709 | 8/2000 |
| WO | 0057990 | 10/2000 |

(Continued)

OTHER PUBLICATIONS

Search Report.
Norwegian Search Report.
International Preliminary Report on Patentability.

*Primary Examiner* — Jelitza M Perez
(74) *Attorney, Agent, or Firm* — Alix, Yale & Ristas, LLP

(57) ABSTRACT

A CO2 capture system includes an intake for CO2-rich exhaust gas to a compressor and one or more outlets for compressed, first CO2-rich gas to a manifold to a shell enclosing parts of a combustion chamber. The combustion chamber has burners to burn fuel and compressed air from a fuel line and an air supply pipe, to form a second, CO2 rich gas.
The wall in the combustion chamber has slits to let in the compressed CO2-rich gas to mix with and cool the other CO2-rich gas formed in the combustion chamber of a third CO2-rich exhaust gas. A heat exchanger operates under high pressure and heat exchanges the third, hot CO2-rich exhaust gas from the combustion chamber with returning CO2-poor exhaust gas from a CO2 extraction plant. The returned, heated CO2-poor exhaust gas is led back to an expander driving the compressor and the CO2 extraction plant.

20 Claims, 8 Drawing Sheets

(51) Int. Cl.
*B01D 53/78* (2006.01)
*F02K 3/00* (2006.01)
*F23J 15/00* (2006.01)
*F23J 15/06* (2006.01)

(52) U.S. Cl.
CPC ............... *B01D 53/78* (2013.01); *F02K 3/00* (2013.01); *F23J 15/006* (2013.01); *F23J 15/06* (2013.01); *B01D 2251/306* (2013.01); *B01D 2251/606* (2013.01); *B01D 2257/504* (2013.01); *B01D 2258/0283* (2013.01); *F23J 2215/50* (2013.01)

(56) References Cited

FOREIGN PATENT DOCUMENTS

| | | | |
|---|---|---|---|
| WO | 2005045316 | 5/2005 | |
| WO | 2017042163 | 3/2017 | |
| WO | WO2019172772 | 9/2019 | |
| WO | WO-2019172772 A1 * | 9/2019 | ............... F23J 5/006 |

* cited by examiner

CARBON DIOXIDE CAPTURE SYSTEM COMPRISING A COMPRESSOR AND AN EXPANDER AND A METHOD OF USING SUCH A SYSTEM

BACKGROUND

The disclosed embodiments concern a CO2 capture process. In embodiments, it is easy to implement by converting a gas turbine. The inventive embodiments could, for example, be included in connection with another gas turbine which generates 60 million watts or more, at the same time as virtually all the CO2 which the gas turbine generates can be extracted in a non-toxic manner, so that all this CO2 can be stored under pressure in reservoirs or be used as a pressure aid in oil production or be included as part of the raw material for industrial production. The inventors have arrived at an economically sustainable process.

More specifically, it is a CO2 capture process comprised of the following steps:
  one compresses CO2-rich exhaust gas (6g) from an external first source (6s) through a compressor (2) and forms a compressed, first CO2-rich gas (6r), and, to anticipate the course of the event, the compressed CO2-rich gas (6r), as well as a second CO2-rich gas (15r) formed in the process downstream of the compressor (2), send out to a carbon capture circuit which returns the now CO2-poor gas (60L) (L for "Lean") back to an expander (3) which is preferably connected to the same main shaft as the compressor (2), and which thereby recovers energy in the CO2-poor gas (60L).

The applicant himself has published a patent application as WO2019172772 which uses a similar construction with a compressor, an afterburning chamber and an expander, and where flue gas from the afterburning chamber is circulated for heat exchange and CO2 extraction in a so-called Hot Potassium Carbonate (HPC) plant.

SUMMARY

The disclosed embodiments concern an apparatus and a CO2 capture process comprised of the following steps:
  one compresses CO2-rich exhaust gas (6g) from an [external] first source (6s) through a compressor (2) and forms a compressed, first CO2-rich gas (6r),
  one burns fuel (14f) via burners (13) with compressed air (15c) in a combustion chamber (11) and forms a second CO2-rich gas (15r) which is under pressure,
  the first compressed CO2-rich gas (6r) is mixed into and cools the second CO2-rich gas (15r) and forms a resulting third, pressurised CO2-rich gas (60r).
  this third, pressurised CO2-rich gas (60r) is discharged through an heat exchanger (16) which exchanges the warmer, third CO2-rich gas (60r) with a colder returning pressurised CO2-poor gas (60L) from a CO2 recycling plant (100)
  where the cooled, third CO2-rich gas (60r) is passed on from the heat exchanger (16) via a pipe (17) to a CO2 extraction plant (100), and where the resulting colder CO2-poor gas (60L) is returned via a line (18) to and heated through the heat exchanger (16),
  where the returned heated CO2-poor gas (60L) is expanded through an expander (3).

BRIEF DESCRIPTION OF THE DRAWINGS

The invention is illustrated in the accompanying drawings, in which.

DETAILED DESCRIPTION

Figure 8:
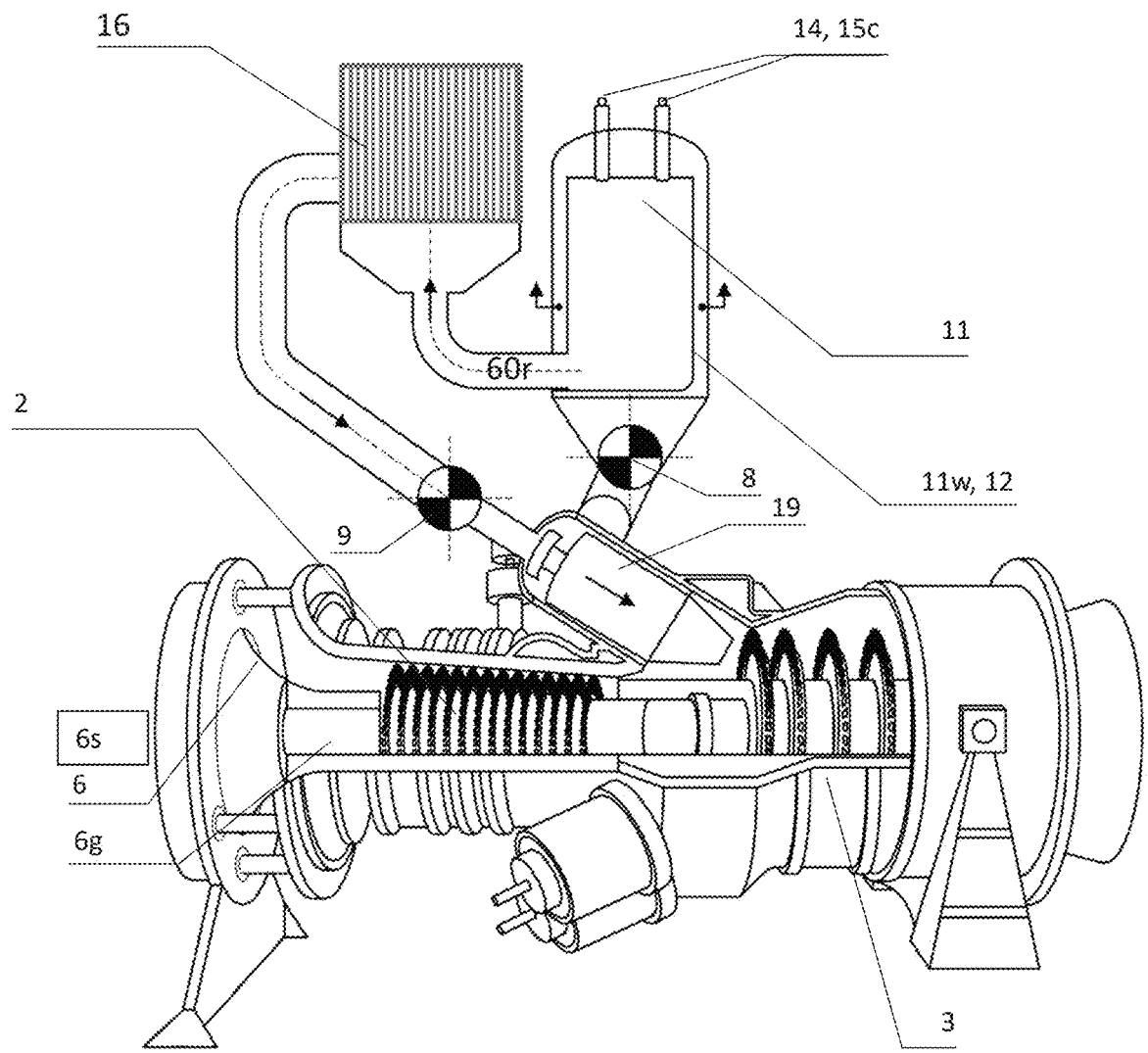
FIG. 8 is an illustration with an overview of a first embodiment arranged with a converted SGT 300 gas turbine.

FIG. 8 is an illustration with an overview of one embodiment of the disclosure arranged with a converted SGT 300 gas turbine, and shows some of the central features of the disclosed embodiments, except the CO2 extraction plant (100) which is not shown here, and the drawing shows a converted gas turbine for receiving a first CO2-rich exhaust gas (6g), where the tops of the original combustion chambers (19) are replaced with outlets for a manifold (8) for the compressed first CO2-rich gas (6r) to one or two Silo Type combustion chambers (11) for supplied compressed air (15c) with supplied fuel NG (14f), where the colder supplied CO2-rich gas (6r) is mixed with and cools the resulting other CO2-rich gas (15r) downstream of the burners (13), and makes up a CO2-rich gas (60r) that reaches a not unnecessarily high temperature and is sent via an heat exchanger (16) to and from the CO2 extraction plant (100) via a second manifold (9) and into the stem (19) of the original combustion chambers as a CO2-poor exhaust gas (60L), and out via the expander (3). The combustion chamber (11) burns compressed air (15c) and fuel (14f) to create a balancing, second CO2-rich exhaust gas (15r) which is to be mixed and cooled downstream with the first CO2-rich exhaust gas (6c) to form the third CO2-rich exhaust gas (60r). 19 is an original combustion chamber on the casing of the gas turbine, and it is shown that the burner has been removed to form an outlet to the manifold (8) for the compressed gas (6g) and return from the second manifold (9) for CO2-poor gas (60L) under pressure. 6 is the intake for flue gas (6g). 3 indicates an expander for CO2-poor flue gas (60L). The SGT 300 industrial gas turbine shown, for example, originally had an output of 62 MW and a pressure ratio of 38:1.

Figure 1:
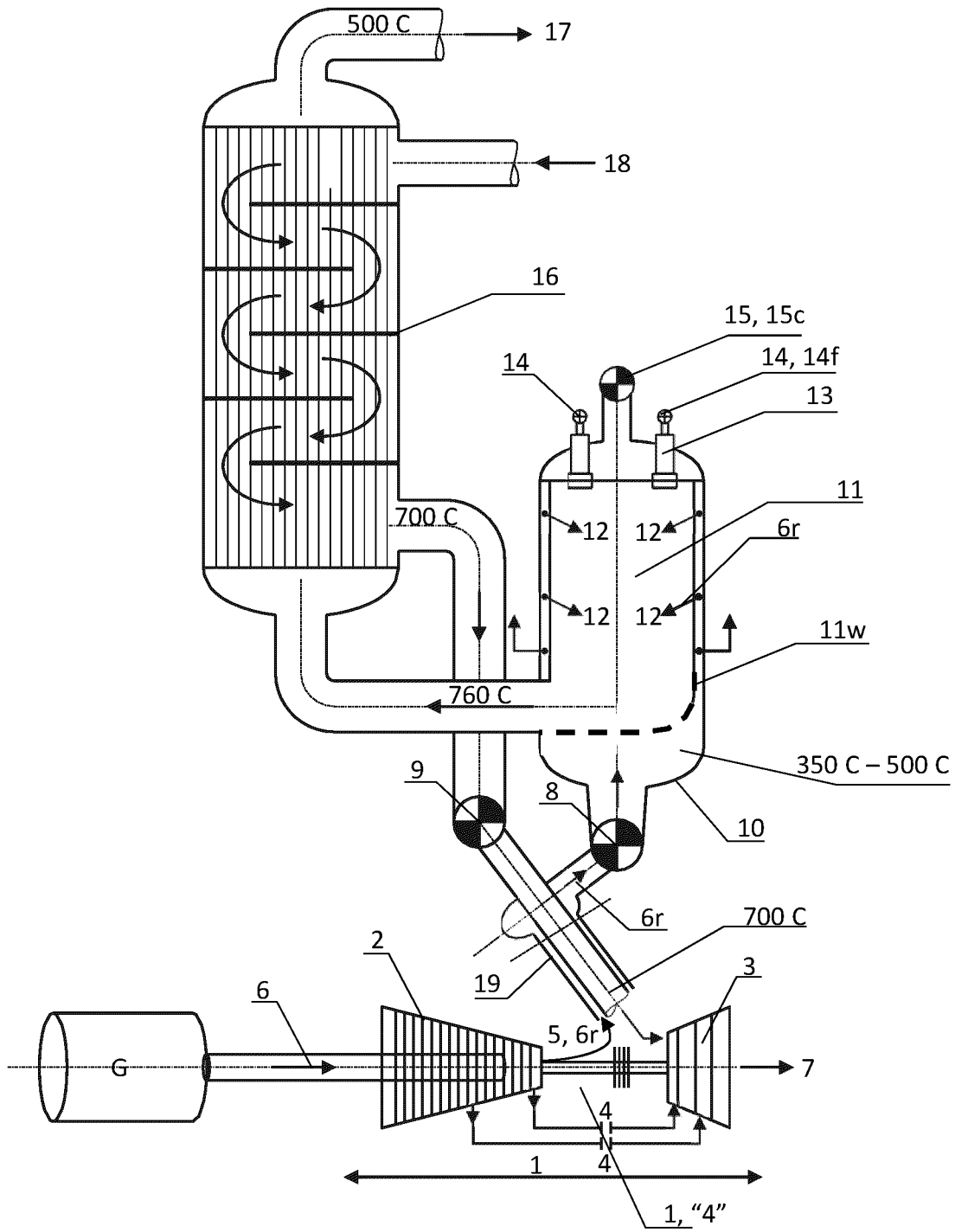
FIG. 1 illustrates an embodiment in more detail.

FIG. 1 illustrates an embodiment in more detail and gives an overview of the combustion chamber (11) which has a wall (11W) with slits (12) for the cooling, compressed CO2-rich exhaust gas (6r). CO2-rich gas (6g) from a first source (6s) is fed into the compressor (2). The heat exchanger (16) receives the additional burned gas (15r) and flue gas (6r) from the combustion chamber (11), and is heat exchanged with the return gas (60L) via the pipe (18) from the CO2 capture plant. Reference numeral (1) indicates a converted gas turbine where the combustion chambers on the casing have had their combustion heads removed as explained above, the exit for 5 from the casing, and the return back to the casing is the same as on a gas turbine (1) which one takes as the starting point. At (19) the ordinary combustion chamber ends before the conversion. Here the annulus (5) leads the exhaust gas (6r) on to the annular manifold (8) and further on to the coat (10) around the combustion chamber (11). In one embodiment there is an inclining outlet to the combustion chamber (11).

The generator (G) is on the cold side and acts as a starter motor, and after start-up really only delivers energy to the CO2 capture process.

Normally, in an original gas turbine (1) we need cooling of the expander (3), this is not necessary now because we run such a low temperature. (4) indicates a now unnecessary cooling line.

By only getting 760 C from the combustion chamber (11) here, instead of 1050 C, it becomes easier to design and build heat exchangers (16) because we can use "off-the-shelf" heat exchangers instead of a high-temperature-resistant heat exchanger HE. The unburned oxygen from the flue gas (6) does not participate in the combustion because it flows in through the slits (12) after the combustion has taken place between the fuel gas (14) and the compressed air (15) in the top of the combustion chamber (11) and will therefore only cool the burned gas (15r).

A fuel line (14) supplies natural gas NG (14f) to the burner (13).

Slits (12) are formed in the wall (11w) of the combustion chamber (11), where the first CO2-rich exhaust (6r) from the coat (10) is mixed only into the combustion chamber (11) after combustion, to dilute the second CO2-rich burned gas (15r). The exhaust gas (6r) from the compressor does not participate in the new combustion, which only takes fresh compressed air (15c) and new fuel gas (14f), preferably natural gas (NG).

Compressed air (15c) which comes in from the compressed air line (15) on top of the combustion chamber (11) supplies air to the burner (13), which emits combustion gas (15r) from (13) with T=1800 C-1900 C, but the volume is only approximately ⅓ of the first CO2-rich flue gas (6r). We thus avoid making burners that will burn with a lower oxygen content, which simplifies a lot, and can use ordinary gas burners.

Flue gas (6r) from the compressor (2) in the coat (10) cools down the wall (11w) in the combustion chamber (11). (11w) indicates the wall (11w) in the combustion chamber (11).

The exhaust gas (7) from the expander (3) has a low CO2 content.

The figure shows, for example 350 C-500 C which depends on the pressure from the compressor. Reference numeral (5) is the exit (5) for compressed CO2-rich gas (6r) from the compressor (2). T=typically 350 degrees Celsius at pressure P=13 Bar.

Figure 4:
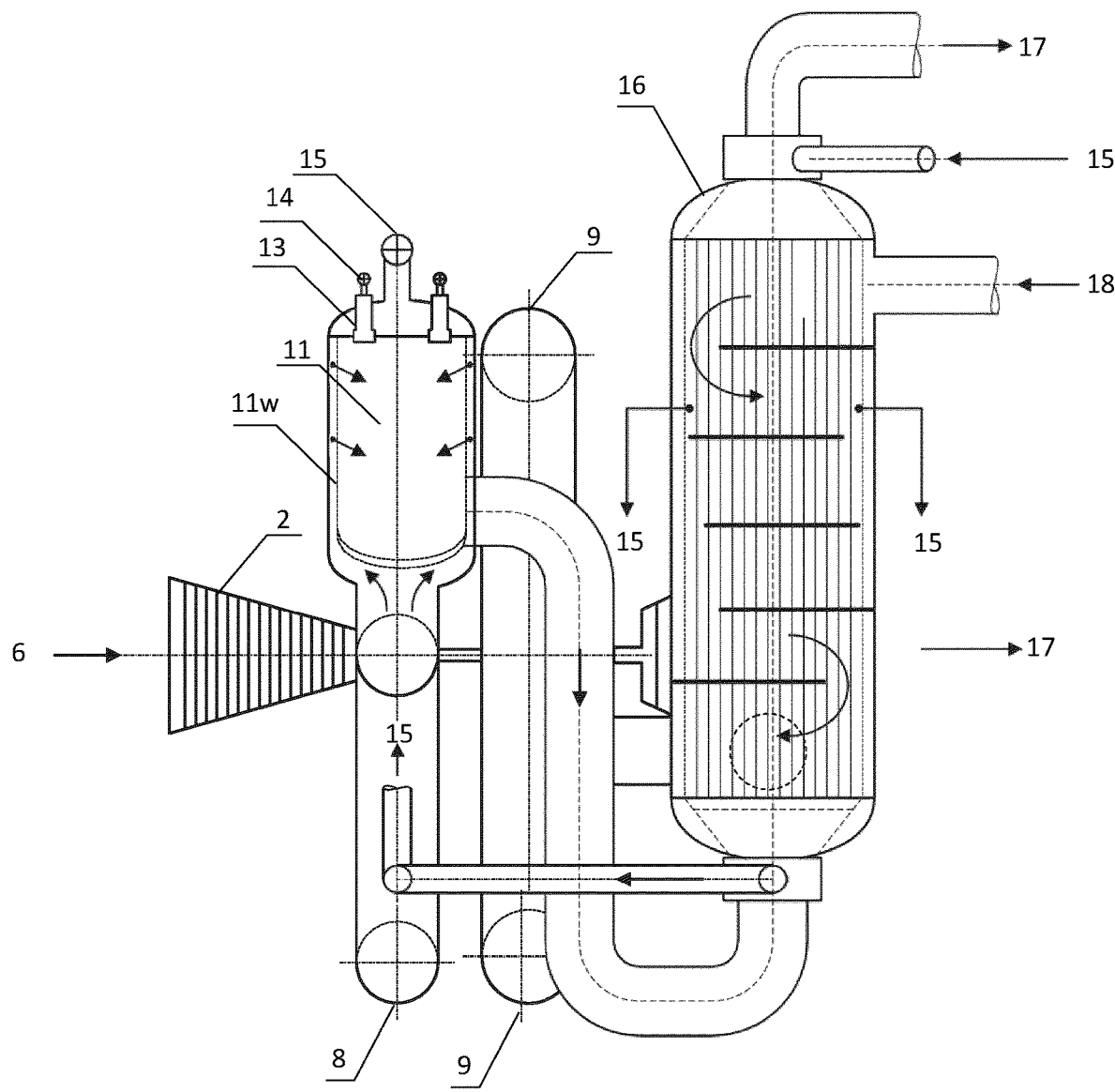

In this figure, the heat exchanger (16) in this embodiment does not have the sophistication that the air supply (15) cools the shell of the heat exchanger (16), which is shown in FIG. 4.

A significant advantage of the arrangement is that because one does not have to use burners designed to burn compressed exhaust gas (6r) with a greatly reduced O2 content, but burners (13) for compressed air (15c) and pressurised fuel (14f) injected upstream of the burners (13); one can use ordinary burners almost "off the shelf", and use ordinary mixing ratios between air and fuel, which provides financial savings in construction and calculations and a cleaner combustion of fuel (14f) without having to make special modifications. The combustion chamber (11) is, in one embodiment, equipped with ceramic tiles with the cooler CO2-rich gas (6r) cooling down the wall (11w) of the combustion chamber (11). Low flue gas outlet temperature from the combustion chamber (11) helps prevent corrosion. This also means that cheaper steel qualities can be used than if the temperature in the combustion chamber had been around 1500 g Celsius, which is the normal initial temperature for the expander in modern gas turbines.

Figure 2:
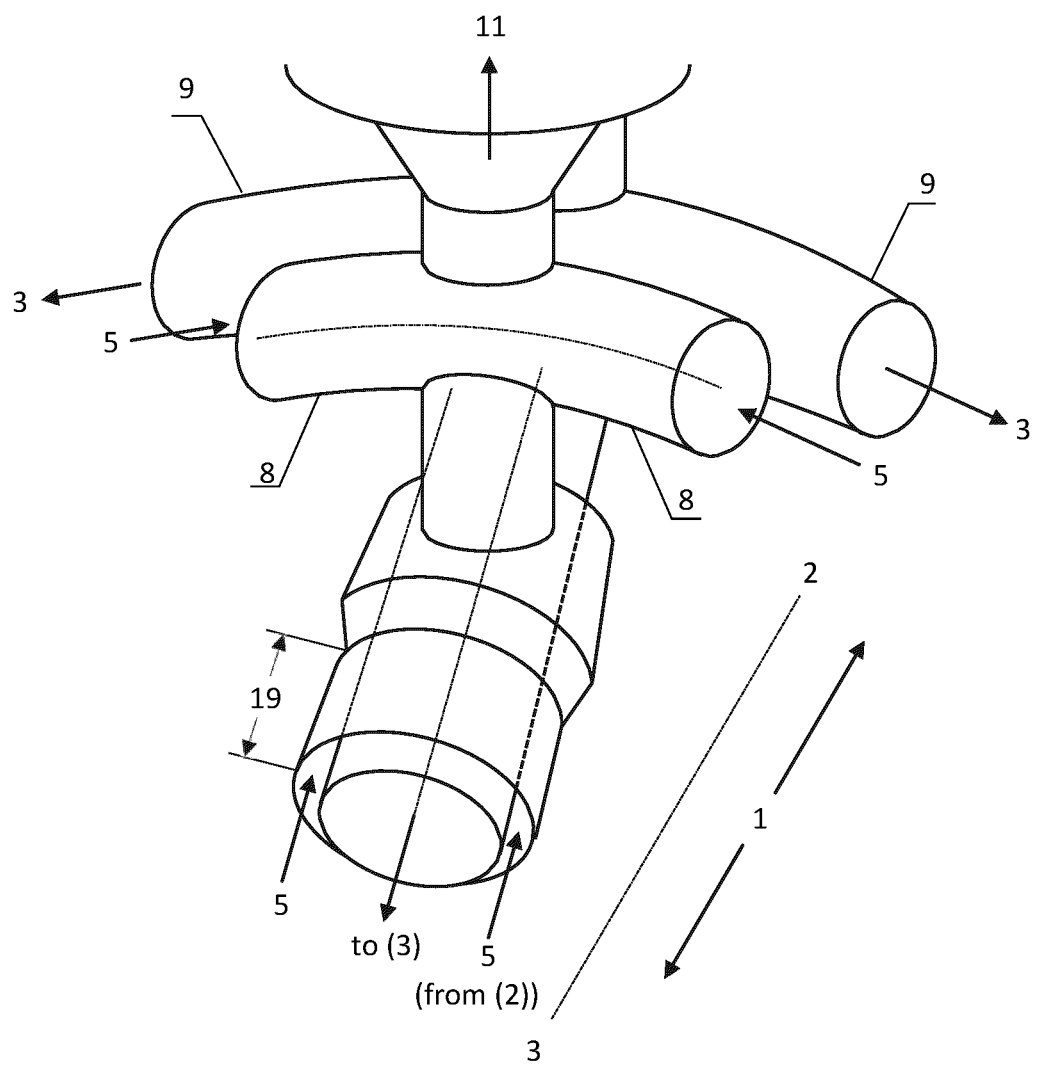
FIG. 2 illustrates in perspective view the exit (5) from the compressor (2) for compressed, CO2-rich gas (6r) out via the coaxial casing (19)

FIG. 2 illustrates in perspective view the exit (5) from the compressor (2) for compressed, CO2-rich gas (6r) out via the coaxial casing (19) (i.e., one of the coaxial casings (19)) and the inner coaxial of the casing return flow for the returning CO2-poor gas (60L) under pressure (P) which shall return to the expander (3). In this case, the casings are obliquely oriented relative to the shaft of the converted gas turbine (2, 3), as also illustrated in FIG. 1. Furthermore, the drawing shows a radial outlet from the outlet (5) to a ring manifold (8) which leads further out to the coat (10) surrounding the combustion chamber (11), and a return flow from the heat exchanger (16) for the CO2-poor gas (60L) back to the ring manifold (9) which leads back to the expander (3). A significant advantage of this arrangement with ring manifolds is the even thermal expansion around the casing which prevents thermal stresses in the plant. A ring manifold (9) leads back to expander (3). A ring manifold (8) which leads further to the coat (10) which surrounds the combustion chamber (11), and a return run from the heat exchanger (16) for the CO2-poor gas (60L) back to the ring manifold (9) that leads back to the expander (3). A considerable advantage with this arrangement with ring manifolds is the even thermic expansion surrounding the casing which prevents thermic tensions in the plant. The ring manifold (9) leads back to the expander (3). Ring manifold (8) leads to the coat (10) that surrounds the combustion chamber (11).

Figure 3:
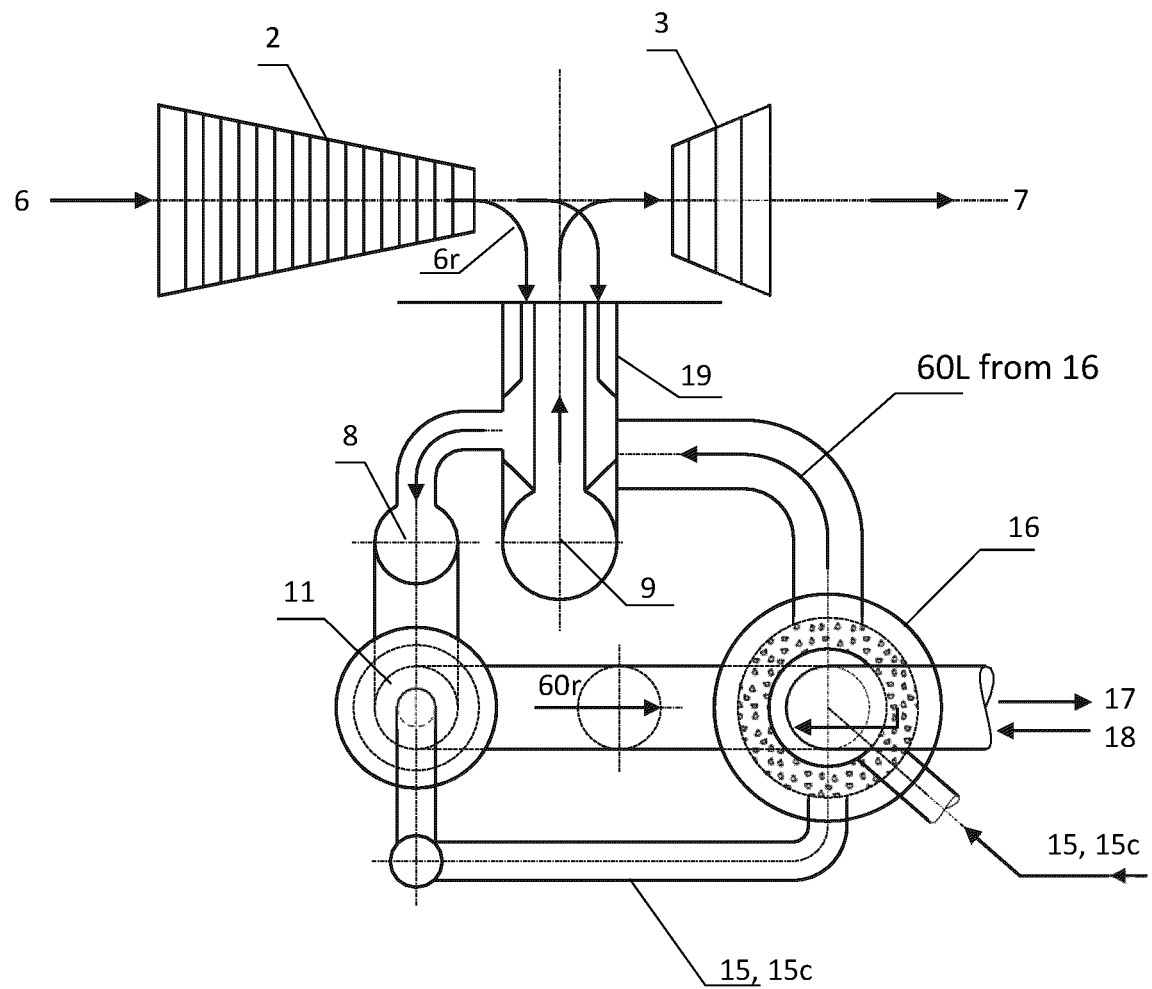
FIG. 3 shows an improvement with respect to the embodiment of FIG. 1 and FIG. 2 from a top view, and also corresponds to FIG. 4, FIG. 4 also shows an improvement with respect to the embodiment of FIG. 1 in section view of the ring manifolds (8) and (9), as well as the combustion chamber (11) in the casing (10), and corresponds to FIG. 3.

FIG. 3 is an improvement with respect to FIG. 1, and corresponds to FIG. 4, but seen from above, and illustrates an embodiment which constitutes an improvement of the embodiment of FIG. 2. FIG. 3 is a partial, principle sketch of a converted gas turbine which is included in the invention by a compressor (2) on the left and an expander (3) on the right in the upper part of the sheet. Reference numeral (19) is an original "burner casing" now without an ordinary burner top and is connected to the ring manifolds (8) and (9). The first CO2-rich compressed gas (6r) flows from the compressor (2) over into a section and an outline of a converted burner casing (19) and over into a section of the first return ring manifold (8) further out into the burner (11) and on to cooling in the heat exchanger (16), and from there out to the CO2 extraction plant (100) from where CO2-poor gas (66L) returns to the HTHP heat exchanger (16). What is new in this embodiment is that the compressed air line cools the coat in that it runs into the top of the HTHP heat exchanger (16) and continues to run as the pipe (15) to the top of the combustion chamber (16) still under pressure (P) but now preheated and is injected with fuel (14f) and ignited by the burners (13). Compressed air (15) comes from a separately powered electric compressor. This can be pressurised and thereby preheat the entire system before starting the whole process. The electric motor can be powered by electricity from a coal power plant which can also be a source (6s) for flue gas (6g).

Compressed air (15c) (from a separately driven electric compressor) which comes in through (15) via the heat exchanger (16) and is finally fed into the top of the combustion chamber (15), delivers air to the burner (13). This emits combustion gas from (13) with T=1800-1900, but the volume is only approximately ⅕ of flue gas. We thus avoid making burners that will burn with a lower oxygen content, which simplifies a lot.

FIG. 4 is also an improvement with respect to FIG. 1 and corresponds to FIG. 3 but is a partial section and view of the ring manifolds (8) and (9), as well as the combustion chamber (11) in the casing (10). Compressed air (15*c*) in the compressed air line (15) cools the coat on the heat exchanger (16). Compressed air (15) which is led to the combustion chamber (finally) enters downwards and cools the shell of (16) and continues as (15) to the combustion chamber (11). Thereby we can regulate the temperature in the combustion chamber (11), while cooling down the wall of the heat exchanger (16). The compressed air (15) flows in with 350 Celsius on top of the heat exchanger (16), and is heated to approximately 400 Celsius, and runs further into the top of the combustion chamber (11) with T=approximately 400 Celsius. It helps the shell of the heat exchanger (16) to have such a low temperature that it can be built easier and with thinner steel than if you operated at a higher temperature.

Furthermore, a vertical section of the heat exchanger (16) is shown with its air-cooled coat for the compressed air supply that forms part of the path of the compressed air in the pipes (15) which ends up at the top of the combustion chamber (11).

In coaxial pipes between the combustion chamber (11) and the heat exchanger (16), and between the heat exchanger (16) and the ring manifold (9) are not needed. The explanation for this is that the diameter of these pipes is approximately one metre, and we can use a high-quality steel that can withstand the current temperatures and thus avoid a coaxial cooling coat that was necessary in our own process. At this lower temperature we avoid high temperature oxidation of steel.

FIG. 4 shows the CO2-gas (60*r*) to Carbon Capture (100) with reference numeral (17) and CO2-depleted gas (60L) from (100) with reference numeral (18).

Figure 5:
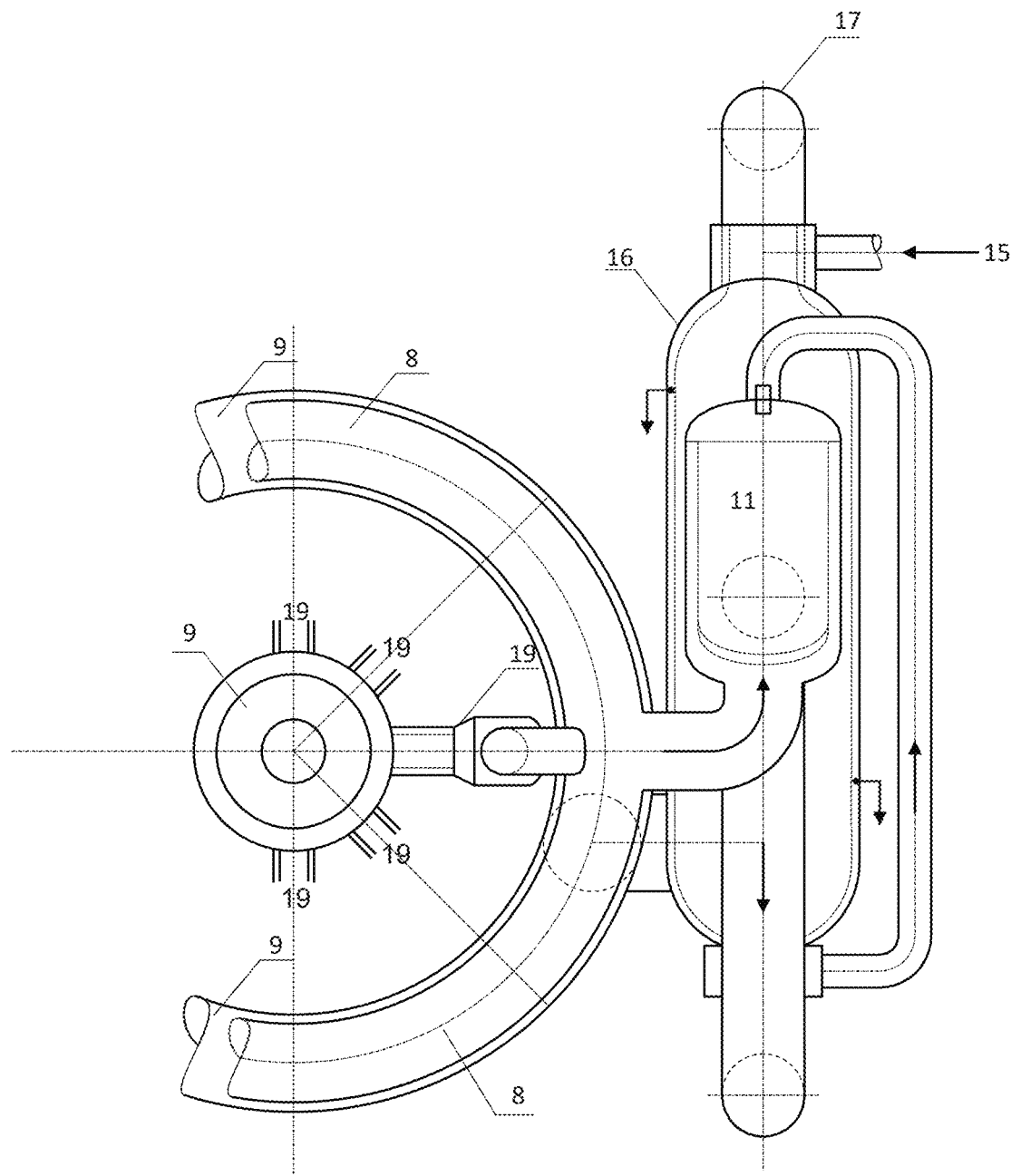
FIG. 5 shows an embodiment according to FIGS. 3 and 4 and is a section and partial view seen axially in the compressor (2) and the expander (3) axis.

FIG. 5 is an embodiment according to FIGS. 3 and 4 and is a section and partial view seen axially in the compressor (2) and the expander (3) axis, and here the ring manifold and at least one of two possible pairs of combustion chamber (11) and heat exchanger (16) is shown. This figure can be symmetrical, here only half is shown. Here there can be two combustion chambers (11) and two heat exchangers (16) connected to one common or two separate CO2 capture plants and in this embodiment the casings (19) are out to and from the manifold pipes (8) and (9) respectively, radially directed and the thermal stresses become very low. This figure can be symmetrical, here only half is shown. There may be two combustion chambers (11) and two CO2 capture plants (100).

Here there is a radial outlet to the combustion chamber (11). Here are the positions (19) of the old combustion chambers for the gas turbine. One of the purposes of this converted gas turbine (1) is to compress gas (6) and not actually to generate energy for export, even though the process emits energy overall. An existing gas turbine generator is converted to an inventive embodiment which comprises a compressor to get CO2 gas purified in an efficient and profitable process. Thus, we get CO2 under high partial pressure into K2CO3—"hot potassium carbonate"—the process that requires high pressure. HPC is a non-toxic, harmless, environmentally friendly CO2 capture process. Ring lines/manifolds (8) and (9) are advantageous. Here there are no thermal stresses due to the fact that the radial pipes are radially directed.

Figure 6:
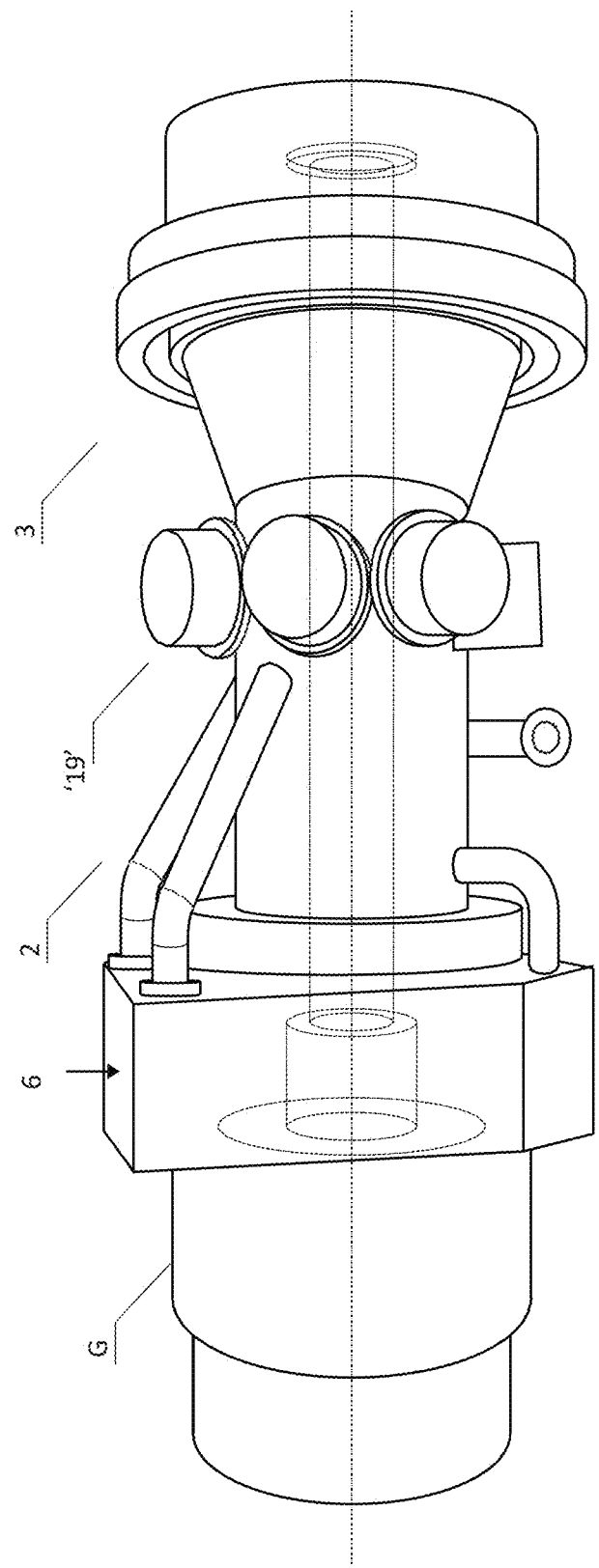
FIG. 6 is a perspective view of an SGT A-65 "Industrial Trent 60" aeroderivative gas turbine, a gas turbine which can be converted for use in the disclosed embodiments.

FIG. 6 is a perspective view of an SGT A-65 "Industrial Trent 60" aeroderivative gas turbine, a gas turbine which can be converted for use within the disclosed embodiments, where the gas turbine here is shown with what, after the conversion, becomes generator (G) to the left, intake (6) for CO2-rich exhaust gas (6*g*), compressor (2), casings (19') with burner tops (which shall be removed to convert to the present invention) and converted to casings (19) for outlet and return, and expander (3) to the right. The radial casings ("19") correspond to the positions (19) shown in FIGS. 3, 4, and 5.

Figure 7:
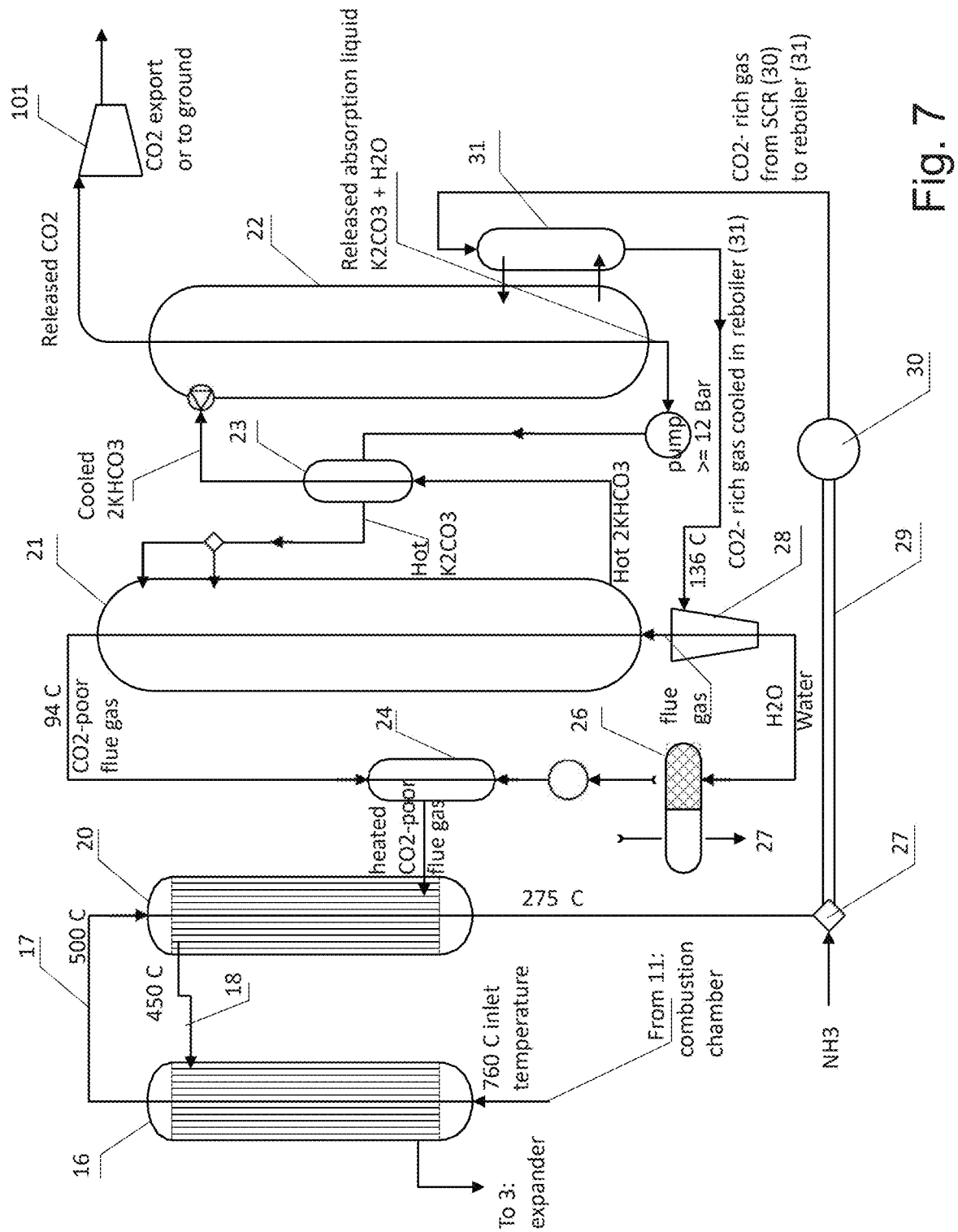
FIG. 7 is a flow diagram of the CO2 extraction plant (100) which is included in a disclosed embodiment.

FIG. 7 is a flow diagram of the CO2 extraction plant (100) which is included in an embodiment. A heat recovery unit (24) has an inlet temperature for water of 136 C/temperature flue gas from (21) of 94 C, temperature difference 42 C.

FIG. 7 shows a stripper (22), where the absorption fluid flows out from a lower part of the stripper (22) and counter current a flue gas in the heating unit, re-boiler (31) and thereafter back in on the stripper (22).

Chemical reaction in the stripper, at e.g. 1 bar: $2KHCO_3 + heat => K_2CO_3 + H_2O + CO_2$ (released).

FIG. 7 shows a heating unit (31) or re-boiler, for heating the adsorption liquid.

Heat is supplied to the heating unit (31) (Re-boiler) with flue gas from the downstream SCR (30).

FIG. 7 shows a self cleaning filter (26).

FIG. 7 shows an absorber (21) that operates at high pressure, 12 bar or higher, and absorption fluid hot $K_2CO_3 + H_2O$ is sprayed in into the top of absorber (21):

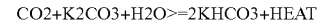

P>=12 Bar,
or P>16 Bar
or P>=19 Bar

FIG. 7 shows a heat exchanger HE (23) that heats the $K_2CO_3$ for the absorber (21), and that heat exchanger HE (23) cools the $2KHCO_3$ to the stripper (22).

FIG. 7 shows a centrifuge (28) separates water from cooled flue gas.

FIG. 7 shows a SCR-unit (30) for NOx capture, ideally at 270 C.

FIG. 7 shows that CO2-rich gas from SCR (30) to reboiler (31).

The inventive embodiments include a CO2 capture system comprising the following features:
an inlet (6) for CO2-rich exhaust gas (6*g*) from an external first source (6*s*) to a compressor (2) and one or more exits (5) for compressed, first CO2-rich gas (6*r*) under pressure (P) to a manifold (8) to a shell (10) enclosing at least parts of a combustion chamber (11) with a wall (11*w*),
wherein the combustion chamber (11) comprises burners (13) arranged to burn fuel (14*f*) and compressed air (15*c*) supplied under pressure (P) from a fuel line (14) and an air supply pipe (15) respectively to form a second CO2-rich gas (15*r*) as combustion gas, where slits (12) are arranged in the wall (11*w*) in the combustion chamber (11) to let in the compressed CO2-rich gas (6*r*) to mix with and cool the combusted CO2-rich gas (15*r*) formed in the combustion chamber (11) to a CO2-rich exhaust gas (60*r*) (note that the compressed CO2-rich gas (6*r*) essentially does not participate in the combustion of fuel (14*f*) and compressed air (15*c*); it is let in downstream for the combustion and dilutes the other CO2-rich gas (15*r*));
a heat exchanger (16), preferably an heat exchanger, arranged to operate under the pressure (P) which is preferably above 12 Bar, and heat exchange the hot CO2-rich exhaust gas (60r) from the combustion chamber (11) with returning CO2-poor exhaust gas (60L) from a CO2 extraction plant (100) under substantially the same pressure (P), where the returned, now heated CO2-poor exhaust gas (60L) is led via a manifold (9) back to an expander (3) which drives the compressor (2) and the CO2 extraction plant (100), and out via an outlet (7).

The compressed air (15c) is led only to the combustion of fuel (14f) at the burners (13) and forms the second CO2-rich gas (15r) and mixing with exhaust gas (6r) from the compressor (2) takes place first downstream of the formation of the other CO2-rich gas (15r). This is an essential aspect of the disclosure: Thus, the compressed air (15c) can be led only to the burners (13) and burned together with fuel (14f) without mixing with the oxygen-poor compressed flue gas (6r) from the compressor (2). This means that you can use ordinary burners (13) and avoid burning the fuel at low oxygen concentrations, which simplifies the plant, provides a faster and easier combustion and lowers the resulting temperature in the resulting CO2-rich flue gas (60r).

Disclosed herein is a CO2 capture process. More specifically, it is a CO2 capture process comprising the following steps:

one compresses CO2-rich exhaust gas (6g) from an external first source (6s) through a compressor (2) and forms a compressed, first CO2-rich gas (6r), and, to anticipate the course of the event, sends the compressed CO2-rich gas (6r), as well as a second CO2-rich gas (15r) formed in the process downstream of the compressor (2), which together form a CO2-rich gas (60r), out to a carbon capture circuit (100) which returns the now CO2-poor gas (60L) (L for "Lean") back to an expander (3) which is preferably connected to the same main shaft as the compressor (2), and which thereby recovers energy in the CO2-poor gas (60L).

Note a few points:

a) The disclosed embodiments are not a gas turbine, but looks confusingly like a gas turbine. But the differences are absolutely essential. The invention advantageously uses a converted gas turbine with relatively small modifications of the starting point itself which is a gas turbine, and one can use existing "off-the-shelf" gas turbines such as "SGT-300 industrial gas turbine" with inclined gas burners relative to the turbine axis, see FIG. 8, or "SGT-A65 (Industrial Trent 60) Aeroderivative gas turbine", please see FIG. 6, with radial gas burners in relation to the turbine axis, and where the compressors (2) and expanders (3) are used as originally designed, also in relation to each other, and in both cases disassembling the tops of the burners and disconnecting the compressed gas stream to flow through parts of a combustion chamber, and the indirect returning gas stream back to the expander.

b) A significant difference between the mentioned gas turbines and the disclosed embodiments is that the gas turbines generate, via their electric generator connected to the shaft on the cold side, energy for export, while in the disclosure the energy in the compressed CO2-rich gas (6r) and additional energy developed in a combustion chamber (11) modified/adjusted for the embodiments, in itself is used to drive the CO2 capture process under pressure (P), including the CO2 recovery plant which in itself requires energy, as well as to drive a second compressor which will deliver compressed air and fuel into the process of combustion.

c) A certain amount of CO2 is taken out via the CO2 extraction plant. To compensate for this CO2, the gas amount which is taken out between the compressor (2) and the expander (3), fuel and compressed air are supplied to a burner in a combustion chamber during the process. The amount of the supplied air and fuel (adjusted for its "lost" share of CO2) forms an amount of CO2-poor gas (15L) which balances the amount which runs through the expander (3) so that you can use the compressor (2) and expander (3) from a "standard" gas turbine without upgrading the axial bearings, which one can convert for our use. In other words: the system is actually a converted gas turbine that is otherwise designed to be able to drive a generator, over to an efficient compressor that feeds flue gas over to a plant for pressurised CO2 capture, and where a compensation gas volume for the total extracted CO2 is formed by burning air and fuel, in order to balance the amount through the compressor with the amount through the expander.

d) The disclosed process does not steal energy from the gas turbine which possibly delivers its exhaust gas (6g) to itself, it consumes energy from fuel (14) supplied in its own process. This fuel (14) is in itself an expense to run the process and it obviously costs what it does, but one will, under the prevailing conditions, get paid for the CO2 which is captured in the CO2 recovery plant because the US authorities provide a tax credit for each tonne of CO2 captured in addition to what oil producers pay by using CO2 for increased oil production, so-called EOR: Enhanced Oil Recovery. One of the significant advantages of the disclosed embodiments is that one can get as much (or significantly more) compensation per tonne of CO2 captured than one consumes in our present process.

e) The disclosed embodiments achieve increase the pressure (P) in the flue gas significantly, to at least 8 and preferably above 12 Bar, or above 16 Bar, or more preferably above 19 Bar, and thus reduces the volume and heat demand of the CO2 capture plant to a very large extent, while at the same time, enabling the pressurised capture process in the CO2 extraction plant (100) proposed as an embodiment.

f) A significant difference is that the inventive embodiments can advantageously utilize the gas turbine gas burner casings and their coaxial return pipes, and the top of these is removed and one fits a transition to an outlet manifold (8) for compressed exhaust gas (6c) and to a return manifold (9) for CO2-poor return gas (6L, 15L) back to the expander. Roughly speaking, you connect a large Silo Type combustion chamber (11) on the outlet manifold (8) where the combustion chamber (11) is connected to a heat exchanger (16) and on to the CO2 capture system (100), and where the return via the heat exchanger (16) runs back to the return manifold (9) and to the expander (3).

g) A significant difference from our own process is that the combustion chamber (11) is not an afterburning chamber, but a combustion chamber. The difference is significant. In the disclosed embodiments, there is no significant afterburning, but a mixture of compressed exhaust gas (6c) which dilutes and cools CO2-rich combusted gas (15r) formed by compressed air (15c) and fuel (14f) which is combusted in a portion of the combustion chamber before this very hot CO2-rich combustion product (15r) formed in the combustion chamber (11) of (15c, 14f) is mixed with colder exhaust. A very important advantage of the disclosed embodiments is that in this new way no higher temperature arises in the outlet part of the combustion chamber and the heat exchanger so that steel grades of an ordinary type can be used in the heat exchanger (16) which could be a high pressure heat exchanger and thus avoid very expensive steel grades and otherwise avoid high temperature corrosion (oxidation) in an otherwise specially high temperature developed high pressure-high temperature heat exchanger which would otherwise withstand complete afterburning (which is avoided).

The loss of the pressure (P) in the CO2 extraction plant is insignificant and is in the range 0.4 Bar.

Regulation System

In an embodiment, the system has a regulation system arranged to regulate the supply of the amount of compressed air (15c) and fuel (14f) substantially equal to the extracted CO2 amount in the CO2 extraction plant so that the gas amount (60L) which runs out on the expander (3) corresponds to the gas amount (6g) which runs in through the compressor (2).

Pressure Conditions

In an embodiment, the pressure is thus in the CO2 capture system comprised of the exit from the compressor (2), the manifolds (8, 9), the combustion chamber (11), the heat exchanger (16), the extraction plant (100), and the inlet of the expander (3) arranged so that the pressure (P) in the CO2-rich gases (6r, 15r, 60r) and the resulting CO2-poor gas (60L) is above 12 Bar, preferably above 16 Bar, and more preferably above 19 Bar.

CO2 Extraction Based on K2CO3

According to an, the CO2 extraction plant (100) is a so-called Hot Potassium Carbonate K2CO3-plant where the extraction plant (100) is comprised of an absorption column (21) which operates under the pressure (P) and with absorption medium comprised of a mixture of water and potassium carbonate K2CO3, wherein the reaction in the absorption column (21) is;

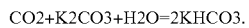

CO2+K2CO3+H2O=2KHCO3.

Electric Generator and Starter Motor

According to an embodiment, an electric generator/starter motor (G) is connected to the compressor (2) and the expander (3), which are otherwise preferably mounted on a common shaft, and preferably on the cold side at the inlet (6), and where the generator (G) generates energy recovered in the expander (3) to drive the process in the compressor (2), the CO2 extraction plant (100) and the system in general.

In a further embodiment the electric generator/starter motor (G) is connected to the compressor (2) and arranged to pressurise the system before start-up, and where energy to the electric motor (G) is taken from outside, from the mains or preferably from a generator in a thermal power plant that also produces the first CO2-rich gas (6s).

In one embodiment, the combustion chamber (11) is a silo-type combustion chamber (11).

Ring Manifold

In an embodiment ntion, the first and second manifolds (8) and (9) are arranged as ring manifolds arranged around the casings (19) and connected to the exit (5) from the compressor (2) and the return to the expander (3), where the casings (19) are what otherwise constitute burners (19') on a converted gas turbine, but where the burner top has been removed.

In an embodiment, the exit (5) from the compressor (2) is a coaxial exit (5) around a modified return (19) from the casing between the compressor (2) and the expander (3) which is otherwise used for one of the burners (19') in a gas turbine.

Preheating of the Compressed Air

According to an embodiment, the compressed air line (15) goes via a cooling coat on the heat exchanger (16) arranged to cool the pressure shell of the heat exchanger (16) combined with preheating the compressed air (15c) before the injection at the top of the combustion chamber (11)(see FIG. 4).

In one embodiment, the lower part of the combustion chamber (11) in the shell (10) is clad on the inside with ceramic tiles (10f) for shielding radiant heat from the combustion process of fuel (14f) and compressed air (15c) at the burners (13).

The Disclosed Method

Above we have described the system for CO2 capture. Here follows the corresponding description of the method, which is a CO2 capture process comprised of the following steps:

one compresses CO2-rich exhaust gas (6g) from an external first source (6s) through a compressor (2) and forms a compressed, first CO2-rich gas (6r), one burns fuel (14f) via burners (13) with compressed air (15c) in a combustion chamber (11) and forms a second CO2-rich gas (15r) which is under pressure (P), the first compressed CO2-rich gas (6r) is mixed into and cools the second CO2-rich gas (15r) to form a resulting third, pressurised CO2-rich gas (60r);

this third, pressurised CO2-rich gas (60r) is discharged through a heat exchanger (16), preferably a high-pressure, high temperature heat exchanger, which heat exchanges the warmer, third CO2-rich gas (60r) with a colder, returning pressurised CO2-poor gas (60L) from a CO2 extraction plant (100), where the cooled, third CO2-rich gas (60r) is passed on from the heat exchanger (16) via a pipe (17) to a CO2 extraction plant (100), and wherein the resulting colder CO2-poor gas (60L) is returned via a line (18) to and heated through the heat exchanger (16), where the returned heated CO2-poor gas (60L) is expanded through an expander (3).

In one embodiment, in that we only get 760 C from the combustion chamber (11) here, instead of 1050 C if one would otherwise use an afterburner technology, it becomes easier to design and build heat exchangers (16) because we can use an "off-the-shelf" heat exchanger (16) instead of a high temperature resistant heat exchanger that can withstand temperatures as high as 1050 C.

Essential advantages are that one gets get pressurised combustion and pressurised cleaning. We now achieve, in one embodiment, to reach 19.5 Bar (or higher pressure) flue gas from 6, and thus get a high efficiency of the CO2 recovery plant (100) and reduce the footprint significantly. This improves efficacy and significantly reduces costs of the process, including the one we ourselves have participated in the development of.

Balanced Amount in and Out

According to an embodiment of the method, the supplied amount of compressed air (15c) and fuel (14f) is regulated substantially equally in relation to the extracted CO2 amount in the CO2 extraction plant so that the gas amount (60L) running out on the expander (3) corresponds to the gas amount (6g) which flows in through the compressor (2), i.e., that the additive gases (15c, 14f) which are burned in the combustion chamber (adjusted for its CO2 content) correspond to the amount of CO2 taken out in the extraction plant (100), and that one can thereby use existing gas turbine constructions as a basis for embodiments. This saves a lot of development costs and allows one to save a lot of time in the construction of embodiments.

Pressure Ratio

As mentioned earlier, the pressure in the CO2-rich gases (6r, 15r, 60r, 60L) in the process between the outlet of the compressor (2) and the inlet to the expander (3) is above 12 Bar, preferably above 16 Bar, and more preferably above 19 Bar.

Hot Potassium Carbonate—Process

In the CO2 capture process, a so-called Hot Potassium Carbonate (HPC) process is used in the CO2 extraction plant (100). Preferably, the CO2 extraction plant (100) operates mainly under the gas pressure in the gas (60r, 60L) corresponding to that of the compressor (2), and in the combustion chamber (11) and the heat exchanger (16), and further back to the expander (3). The expander (3) operates under a pressure corresponding to that in the combustion chamber (11) with a deduction of a pressure drop of approximately 0.4 Bar that occurs in pipes, heat exchangers, NOx absorption unit (SCR) (30), boiler for heating absorption liquid (31) and centrifuge (28).

According to an embodiment, an absorption column (21) with absorption medium comprised of a mixture of water and potassium carbonate K2CO3 is used in the extraction plant (100), where the reaction in the absorption column (21) is

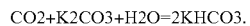

CO2+K2CO3+H2O=2KHCO3.

This equation is stoichiometrically balanced.

According to an embodiment of the method, an electric generator/starter motor (G) is connected to the compressor (2) and the expander (3), preferably on a common shaft, and preferably on the cold side at the inlet (6), and where the generator (G) generates energy recovered in the expander (3) to drive the process in the compressor (2), the CO2 extraction plant (100) and the system in general. The generator's capacity will cover the system's auxiliary systems for pumping fuel, lubricating oils, compressing air, etc., and the generator can be switched to act as a starter motor to cover the auxiliary systems of the entire process so that the entire system can be pressurised using the compressor (2) before starting up the burners (13), the CO2 extraction plant (100), pressure injection of fuel (14f), compression for the supply of supply air (15c), circulation of lubricating oils, etc.

According to one embodiment, the first CO2-rich exhaust gas (6s) is supplied from an external gas turbine (6s). In another embodiment, the source is a coal-fired thermal power plant (6s), or a cement plant, a refinery cracker, or a waste incineration plant, which supplies the CO2-rich exhaust gas (6g).

We then refer to FIG. 7:

The function of the converted gas turbine is mainly limited to compressing flue gas from external sources, as well as generating sufficient electrical power in the generator (G) to drive the turbine's auxiliary systems. The generator (G) also has a function as a starting motor. The absorber (21) will operate at a pressure (P) 12 Bar or higher. This means that an environmentally friendly absorbent with low selectivity can be used as potassium carbonate (K2CO3). Furthermore, compared to absorption at atmospheric pressure will the cost of the absorber (21) be reduced to approximately 1/12. At atmospheric pressure, only absorbents with high selectivity can be used such as MonoEthyleneAmine. Expensive chemicals are added to MEA that reduce degeneration, corrosion, foaming and the establishment of blocking stable salts. Furthermore, flue gas emissions from such a plant into the atmosphere will contain carcinogenic chemicals such as Nir—Nitrous Amines. Even extremely low concentrations, more than 1 nanogram per cubic metre, will pose health risks.

In an embodiment, flue gas (60r) has an inlet temperature at the heat exchanger (16) which is selected to be 760 C (ref. also FIG. 1). The relatively low temperature of the flue gas is due to a reduced amount of natural gas supplied to the burners (13). Standard burners can be used by supplying burners only with air, compressed air (15c). The heat exchanger (16) operates with flue gas temperatures at a level that is sufficiently low to be purchased with operating guarantees. Furthermore, the temperatures are so low that high temperature oxidation is avoided.

In an embodiment, the heat flue gas (60r) with a temperature of 275 Celsius is passed from the heat exchanger (20) to a nozzle (27) for feeding in ammonia (NH3). Downstream of the nozzle, NH3 and the flue gas are mixed in a tube with "guide vanes" upstream of the NOx capture unit (30) which can operate at the Selective Catalytic Reduction (SCR) unit. The unit preferably operates at an optimal temperature of 270 degrees Celsius. From the Selective Catalytic Reduction (SCR) (30) the flue gas is led by a pipeline to a boiler (31) for heating the absorption liquid.

This arrangement is cost-reducing compared to conventional steam heating. From the boiler (31) the flue gas is led to a centrifuge (28). The centrifuge separates water from the flue gas. This is very advantageous as water supply to and contamination of the absorption liquid in the absorber (21) is prevented.

Water separated from the centrifuge (28) is led to a self-cleaning filter (26). From the filter (26) the water is led to a high-pressure pump (25). Then pressurised water is led to nozzles in the heat recovery unit (24) so that the temperature of the flue gas from the absorber (21) is increased before entering the heat exchanger (20).

Thus, the gas burners (13) will operate on clean air.

An embodiment can be based on a gas turbine SGT5-2000E—187 MW/50 Hz.

In the combustion chamber ('19')

CO2-rich gas (6r) will not run into the top of the silo-type combustion chamber (11). Only compressed air (15c) and fuel (14f) are fed into the burners (13) at the top of the combustion chamber (11).

CO2-rich gas (6r) will be sent through slits (12) in the wall (11w) in the combustion chamber to cool and mix into the combustion gas (15r) from the burners (13).

Preliminary Calculations:

Natural gas such as fuel (14f) which is fed into the burners (13): 4 Kg/sec

Pressurised air (15c) to the burners (13): 111 Kg/sec

Power supplied by generator (G): 37 MW

Exhaust gas, the third CO2-rich gas (60r) temperature out of combustion chamber (11): 756 degrees Celsius Return gas (60L) temperature from heat exchanger (16) to expander (3): 700 degrees Celsius amount of CO2 trapped: 103 kg/sec.

Start-Up of the System:

Electric power (60 Hz) supplied to static frequency converter (SFC) for:

Generator/electric starter motor (G)

Clutch/gas turbine generator

Power Consumers:
Air compressor: 43 MW/purchased 60 Hz electric power.
CO2 export compressor (101); 40 MW/purchased 60 Hz electrical power.
"Catacarb" compressors; 10 MW
Accessories & utilities; 3 MW
Excess power/power margin 50 Hz: 24 MW.
Purchase of external power: 83 MW at an estimated price of 4 cents/Kwh; 3320 $/h We refer to FIG. 1: (1) is a converted gas turbine which is the starting point for building the disclosed system. (4'): is a now unnecessary cooling line from compressor (2) to expander (3) also not replaced by the gas from No. 6, because expander (3) is sensitive to contaminants. The cooling requirement for expander (3) will normally require 5% of the total from the compressor (2), but now everything goes to CO2 capture. This gives a 5% improvement.

COMPONENT LIST

| No | Component | Explanation and comment |
|---|---|---|
| 1 | (converted gas turbine) | |
| 2 | Compressor | Receives and compresses CO2-rich exhaust (6g) from first source (6s) to a compressed first CO2-rich gas (6r) |
| 3 | Expander | |
| 5 | Outlet (5) | Outlet (5) for the compressed CO2 gas (6r) preferably to a ring manifold (8) |
| 6 | Inlet from source (6s) | A preferably external first source (6s) for CO2-rich exhaust gas (6g), f. ex a gas turbine, a cement kiln, a coal fire station or diesel generators |
| 6s | Source (6s) | |
| 6g | Exhaust from an external source | CO2-rich exhaust gas (6g) from the first source (6s) |
| 6r | First compressed CO2-rich gas | Compressed CO-rich gas (6r) from compressor (2) |
| 7 | Waste gas (7) from expander (3) | The waste gas (7) is the expanded returned CO2-poor gas (60L) |
| 10 | Coat | Coat with ceramic tiles (10) that surround the combustion chamber (11) |
| 11 | Combustion chamber | Combustion chamber, preferably Silo type combustion chamber (11) |
| 11w | Wall in combustion chamber | |
| 12 | Slits | Slits (12) in the wall (11w) in the combustion chamber to let in the compressed first CO2-rich gas (6r) |
| 13 | Burners (13) | Burners (13) to burn compressed air (15c) and fuel (14f) [the top of/ one end] in a combustion chamber (11) |
| 14f | Fuel (14f) | |
| 14s | Fuel supply line (14s) | |
| 15 | Compressed air pipe (15) | Line (15) for supply of compressed air (15c) preferably for cooling and combustion |
| 15c | Compressed air (15) | |
| 15r | Another CO2-rich gas (15r) | Formed by burning compressed air (15c) and fuel (14f) [at the top of/at one end of] the combustion chamber (11) |
| 60L | Returning CO2-poor gas (60 L) | [colder] returning CO2-poor gases [gas fractions] (60L) that are heated up through the heat exchanger (16) |
| 16: | First heat exchanger (16) | First heat exchanger, preferably high-pressure, high temperature exchanger (16) |
| 17 | Outlet pipe from heat exchanger (16) | To CO2 recovery installation site (100) |
| 18 | Return pipe to heat exchanger (16) | |
| 60r | Returning third CO2-rich gas (under pressure) | The resulting mixture (60r) of the hot other CO2-rich gas (15r) diluted with the colder first CO2-gas (6r) from the compressor (2) |
| 60L | Returning CO2-poor gas (60L) | [colder] returning CO2-poor gases [gas fractions] (6L, 15L) = (60L) that are heated up again through the heat exchanger (16) |
| 100 | CO2 recovery installation | |
| 24 | heat recovery unit | |
| 25 | pump | |
| 21 | absorber | |
| 22 | stripper | |
| 23 | heat exchanger | |
| 26 | filter | |
| 28 | centrifuge | |
| 31 | reboiler | |
| 30 | SCR | |
| 101 | export CO2 | |

The invention claimed is:

1. A CO2 capture system comprising:
an intake (6) for $CO_2$-rich exhaust gas (6g) from a first source to a compressor (2) and one or more outlets (5) for a compressed, first $CO_2$-rich gas (6r) under pressure (P) to a first manifold (8) to a shell (10) enclosing at least parts of a combustion chamber (11) with a wall (11w), the combustion chamber (11) comprising burners (13) arranged to burn fuel (14f) and compressed air (15c) supplied under pressure (P) from a fuel line (14) and a compressed air line (15), respectively, to form a second $CO_2$-rich gas (15r) in burners (13) without mixing with the first $CO_2$-rich gas (6g) from the compressor (2),
slits (12) in the wall (11w) in the combustion chamber (11) to let in the compressed, first $CO_2$-rich gas (6r) to mix with and cool the second $CO_2$-rich gas (15r) formed in the burners (13) to form a third $CO_2$-rich exhaust gas (60r);
a heat exchanger (16) arranged to operate under pressure (P) and to heat exchange the hot third $CO_2$-rich exhaust gas (60r) from the combustion chamber (11), and out via a pipe (17) to a $CO_2$ extraction plant (100), with returning $CO_2$-poor exhaust gas (60L) from the $CO_2$ extraction plant (100) via a line (18) under pressure (P) to form returned heated $CO_2$-poor exhaust gas (60L),
a second manifold for leading the returned, now heated $CO_2$-poor exhaust gas (60L) back to an expander (3) that drives the compressor (2) and the $CO_2$ extraction plant (100), and out via an outlet (7).

2. The CO2 capture system according to claim 1, comprising a regulation system arranged to regulate a supply of compressed air (15c) and fuel (14f) that is substantially equal to an amount of extracted CO2 in the CO2 extraction plant such that a gas amount (60L) which runs out on the expander (3) corresponds to a gas amount (6g) which runs in through the compressor (2).

3. The $CO_2$ capture system according to claim 1, wherein the compressor, the first and second manifolds (8,9), the combustion chamber (11), the heat exchanger (16), the $CO_2$ extraction plant (100) and the expander (3) are adapted to the pressure (P) in the $CO_2$-rich gases (6r, 15r, 60r) and the resulting $CO_2$-poor gas, (60L) above 12 bar.

4. The CO$_2$ capture system according to claim 1, wherein the CO$_2$ extraction plant (100) is a hot potassium carbonate (K$_2$CO$_3$) plant, the CO$_2$ extraction plant (100) comprises an absorption column (21) operating under the pressure (P) and is arranged for operation with absorption medium comprising a mixture of water and potassium carbonate (K$_2$CO$_3$), wherein the reaction in the absorption column (21) is:

$$CO_2+K_2CO_3+H_2O=2KHCO_3+HEAT.$$

5. The CO2 capture system according to claim 1, comprising an electric generator/starter motor (G) connected to the compressor (2) and the expander (3), wherein the generator (G) is arranged to generate energy recovered in the expander (3) to drive the process in the compressor (2), the CO2 extraction plant (100) and the system generally.

6. The CO2 capture system according claim 5, wherein the electric generator/starter motor (G) is connected to the compressor (2) and arranged to pressurize the system before start-up, and the energy of the electric motor (G) is taken from outside, from the net or from a generator in a thermal power plant that also produces the first CO2-rich gas (6s).

7. The CO2 capture system according to claim 1, wherein the combustion chamber (11) is a silo-type combustion chamber (11).

8. The CO$_2$ capture system according to claim 1, wherein the first and second manifolds (8) and (9) are ring manifolds arranged around casings (19) and connected to the one or more outlets (5) from the compressor (2) and the return to the expander (3).

9. The CO$_2$ capture system according to claim 1, wherein one of the one or more outlets (5) from the compressor (2) is a coaxial outlet (5) around a return pipe of a casing (19) between the compressor (2) and the expander (3).

10. The CO$_2$ capture system according to claim 1, wherein the compressed air line (15) is led via a cooling coat on the heat exchanger (16) arranged to cool a pressure shell of the heat exchanger (16) combined with preheating the compressed air (15c) before the injection on top of the combustion chamber (11).

11. The CO2 capture system according to claim 1, wherein a lower part of the combustion chamber (11) in the shell (10) is clad on the inside with ceramic tiles (10f) for shielding radiant heat from the combustion process of fuel (14f) and compressed air (15c) at the burners (13).

12. A process for CO$_2$ capture using the CO$_2$ capture system of claim 1, comprising the steps of:
compressing the CO$_2$-rich exhaust gas (6g) from the first source (6s) through the compressor (2) to form the compressed first CO$_2$-rich gas (6r);
burning fuel (14f) via the burners (13) with compressed air (15c), the burners (13) being arranged in the top portion of the combustion chamber (11) to form the second CO$_2$-rich gas (15r) which is under pressure (P);
passing the first compressed CO$_2$-rich gas (6r) through slits (12) in the burner wall (11w) into the combustion chamber (11) to mix into and cool the second CO$_2$-rich gas (15r) to form the resulting third CO$_2$-rich gas (60r); and
discharging the third CO$_2$-rich gas (60r) through the heat exchanger (16) which heat exchanges the warmer third CO$_2$-rich gas (60r) with returning CO$_2$-poor gas (60L) from the CO$_2$-extraction plant (100), wherein the cooled third CO$_2$-rich gas (60r) is passed on from the heat exchanger (16) via the pipe (17) to the CO$_2$ extraction plant (100), wherein the returning CO$_2$-poor gas (60L) is returned via the line (18) to and heated through the heat exchanger (16) under pressure, and the returned heated CO$_2$-poor gas (60L) is expanded through the expander (3).

13. The process according to claim 12, wherein an amount of compressed air (15c) and fuel (14f) supplied is regulated equally in relation to an amount of extracted CO2 in the CO2 extraction plant so that a gas amount (60L) which runs out onto the expander (3) corresponds to a gas amount (6g) which flows in through the compressor (2).

14. The process according to claim 12, wherein the pressure in the CO2-rich gases (6r, 15r, 60r, 60L) in the process is above 12 Bar.

15. The process according to claim 12, wherein in the CO$_2$ extraction plant (100) an absorption column (21) with absorption medium comprising a mixture of water and potassium carbonate (K$_2$CO$_3$), wherein the reaction in the absorption column (21) is:

$$CO_2+K_2CO_3+H_2O=2KHCO_3+HEAT.$$

16. The process according to claim 12, wherein the CO2 extraction plant (100) operates under the gas pressure in the gases (60r, 60L) corresponding to that of the compressor (2), and in the combustion chamber (11) and the heat exchanger (16), and further back to the expander (3).

17. The process according to claim 12, wherein an electric generator/starter motor (G) is connected to the compressor (2) and the expander (3), and the generator (G) generates energy recovered in the expander (3) to drive the process in the compressor (2), the CO2 extraction plant (100) and the system generally.

18. The process according to claim 12, wherein an electric generator/starter motor (G) is connected to the compressor and pressurizes the system before start-up, and energy of the electric motor (G) is taken from outside, from the net or from a power plant that also produces the first CO2-rich exhaust gas (6s).

19. The process according to claim 12, wherein the first source (6s) is an external gas turbine, which supplies the CO2-rich exhaust gas (6g).

20. The process according to claim 12, wherein the first source (6s) is a coal-fired, thermal power plant (6s), or a cement plant, a refinery cracker, or a waste incineration plant, which supplies the CO2 rich exhaust gases (6g).

* * * * *